United States Patent [19]

Royer et al.

[11] 4,300,598
[45] Nov. 17, 1981

[54] TUBULAR STEEL MEMBERS FOR UNDERWATER PIPELINES

[75] Inventors: Alain L. A. Royer, Vandoeuvre les Nancy; Jean-Claude B. Roques, Fumel; Bernard J. L. Dumas, Nancy, all of France

[73] Assignee: Pont-A-Mousson S.A., Nancy, France

[21] Appl. No.: 47,963

[22] Filed: Jun. 12, 1979

[30] Foreign Application Priority Data

Jun. 13, 1978 [FR] France .................. 78 17865

[51] Int. Cl.³ .................. F16L 9/22; C22C 38/04
[52] U.S. Cl. .................. 138/177; 138/103; 138/155; 138/172; 138/178; 285/286; 75/123 J; 75/123 CB; 75/130 R
[58] Field of Search .............. 138/103, 155, 172, 177, 138/178; 285/286; 75/123 CB, 123 J, 125, 130 R

[56] References Cited

U.S. PATENT DOCUMENTS

| | | | |
|---|---|---|---|
| 1,954,892 | 4/1934 | Russell et al. | 138/177 |
| 1,979,594 | 11/1934 | Williams | 138/177 X |
| 2,194,178 | 3/1940 | Becket | 138/177 |
| 2,396,704 | 3/1946 | Kerr | 138/155 X |
| 2,400,495 | 5/1946 | Ford et al. | 138/177 |
| 3,096,105 | 7/1963 | Risley | 138/155 X |
| 3,562,028 | 2/1971 | Heitmann | 75/123 J X |
| 3,860,039 | 1/1975 | Ells | 138/177 X |
| 4,043,807 | 8/1977 | Kirman | 75/123 J X |

*Primary Examiner*—James E. Bryant, III
*Attorney, Agent, or Firm*—Sughrue, Mion, Zinn, Macpeak & Seas

[57] ABSTRACT

Tubular members of lightly alloyed weldable steel are utilized as a stiffening member for pipelines to prevent buckling and the spread of cracks in pipelines laid off the coast, either under or above water. The tubular member (R, R1) is constructed of centrifugally cast steel and is adapted to be connected to another similar member or to a standard pipe (T) of the pipeline. The member has a substantially increased thickness (2, 15) and is subjected to thermal treatment in order to obtain a homogeneous ferritic structure.

3 Claims, 5 Drawing Figures

TUBULAR STEEL MEMBERS FOR UNDERWATER PIPELINES

The present invention relates to the manufacture of tubular steel members for underwater pipelines or pipelines crossing vast expanses of water and in particular to the manufacture of tubular members or couplings from special alloyed steels which serving as stiffening members for preventing deformations in off-shore under water pipelines.

It is known that under certain conditions depending upon the length of under water piplines, the depth at which they are laid and the water pressure, pipes may deform locally. The predominant mode of deformation is buckling in which the tubular member may be bent into the shape of a dog's bone and into a U-shape. These deformations may also occur when the pipes are in use due to sudden change of pressure or an impact of some type. Deformations of this type may spread along the entire length of the pipe-line whether it is completely submerged or whether it has interruptions in that it is raised above the water on platforms.

In order to eliminate catastrophic spreading of the buckling wave, stiffening members or "buckle arrestors" are provided at regular distances. These members are intended to stop buckling and to prevent any tendency for it to spread.

Furthermore, under certain conditions of mechanical stress, cracks may appear or develop if they existed previously in the pipes themselves. This type of defect is able to spread very quickly along the pipelines.

Tubular stiffening members for preventing the spread of buckling or "buckle arrestors" are known which are constructed in the form of sleeves surrounding a limited length of a tubular member and are thus of greater diameter than the outer diameter of the pipelines. The free annular space between the sleeve and the enclosed tubular member may be filled by a type of mortar which does not shrink. The spacing between stiffening members of this type determines the length to be repaired in the case of buckling.

The previously-known members or "buckle arrestors" created a metallic and physical discontinuity in the under water pipe-line and consequently have a number of drawbacks including a discontinuity of the mechanical characteristics which may render the stiffener ineffective and corrosion of the outer casing of the sleeve due to electrical discontinuities with the anodes positioned on the pipe itself.

In addition, such stiffening members are not capable of arresting the spread of cracks. They are therefore not "crack arrestors." Finally, installation of the latter is not very easy.

With a view of overcoming these drawbacks, the present invention relates to a method for the manufacture of an anti-buckle and anti-crack tubular stiffening member or "buckle crack arrestor," the method being charcterised in that it includes providing a special low carbon steel of the manganese-molybdenum type containing at least one element generating special carbides such as molybdenum, pouring this steel into a centrifugal casting mould the inner wall of which has at least one cylindrical surface corresponding to the outer surface of the tubular member to be obtained driving the centrifugal casting mould at a high rotary speed during casting thus subjecting the steel poured therein to a high acceleration, and subjecting the tubular member thereby obtained to a thermal treatment terminating in annealing.

By the use of this method, it is possible to produce one-piece tubular members which may be welded together and/or to pipes of the same diameter as the cylindrical part of smallest diameter. Tubular members of this type may have large diameters and may be of considerable thickness.

The invention also relates to an anti-crack tubular stiffening member or "buckle crack arrestor" able to stop the spread both of buckling waves and cracks in the pipes of under water pipe-lines, characterised in that it is of one-piece construction and has a cylindrical part of the same diameter as that of the standard pipe of the pipe-line and a cylindrical part whose diameter and radial thickness are substantially greater than the first part, the two parts being connected to each other by a frustoconical surface with the cylindrical internal cavity of the tubular member having a constant diameter from one end to the other, and with the tubular member being made from special low carbon steel containing manganese-molybdenum including at least one element generating special carbides such as molybdenum and having a homogeneous ferritic structure with fine grains and carbides dispersed homogeneously in the ferrite.

Further features and advantages will become apparent from the description which follows.

In the accompanying drawings, given solely by way of example,

DESCRIPTION OF THE PREFERRED EMBODIMENTS

Figure 1:
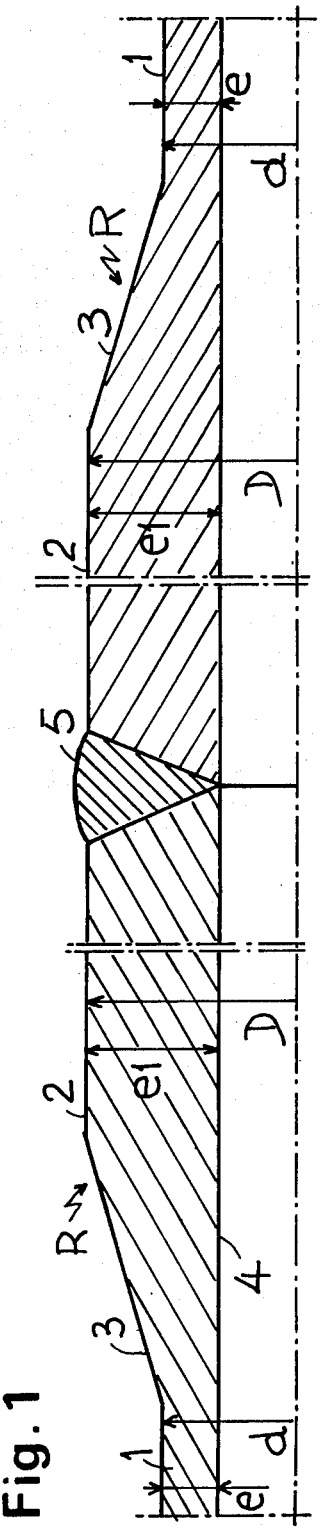
FIG. 1 is a partial cross-sectional view of a tubular member of an underwater pipeline including an anti-buckle and anti-crack stiffening member or "buckle crack arrestor;"

According to the embodiment of FIG. 1, the invention relates to producing by centrifugal casting of a special steel or alloyed steel of suitable composition, an anti-buckle and anti-crack tubular stiffening member or buckle-crack arrestor of large diameter and thickness having an increased thickness over part of its length and having the shape specified below.

This stiffening member R, of which the axis is outside the limits of the figure, is in fact a tube of great length of which only a very small part is illustrated. It includes a standard part or body 1 of minimum diameter d and minimum thickness e of the same values as the diameter and thickness of the standard part of the standard pipe of the pipe-line. At one end, the stiffening member R has an enlarged tubular portion 2 of maximum diameter D and maximum thickness e1 substantially greater than the diameter d and the thickness e. The tubular parts 1 and 2 are connected by an intermediate portion 3 which is externally frustoconical and internally cylindrical.

The stiffening member R has an internal cylindrical cavity of constant diameter equal to the diameter of the standard tube, not shown, of the pipelines.

Two consecutive stiffening members R are connected and welded at a weld bead 5, between their enlarged end portions 2.

Each enlarged end portion 2 may have a length of several dozen centimeters to 2 meters whereas the body 1 has a length of several meters and possibly more than 10 meters. The thickness e of the body 1 is on the order of 1 inch for example, i.e. 25.4 millimeters, whereas the excess thickness e1 of the enlarged portion 2 is greater than 2 inches, i.e. greater than 50 millimeters for an inner diameter of the cavity 4 greater than 500 millimeters.

According to the invention, in order to produce a tubular stiffening member as in FIG. 1, a special low carbon alloyed steel of the mangonese molybdenum type is utilized, containing a maximum of 0.08% by weight carbon. The steel should include metal-generating special carbides such as molybdenum, but niobium, vanadium or tantalum may be used as well. This steel has the following composition as a percentage by weight of the total, in addition to iron:

carbon: less than or equal to 0.08%,
silicon: less than or equal to 0.30%,
manganese: from 1.20 to 2.20%,
molybdenum: from 0.20 to 0.50%,
sulphur: less than or equal to 0.010%,
phosphorus: less than or equal to 0.015%.

Figure 2:
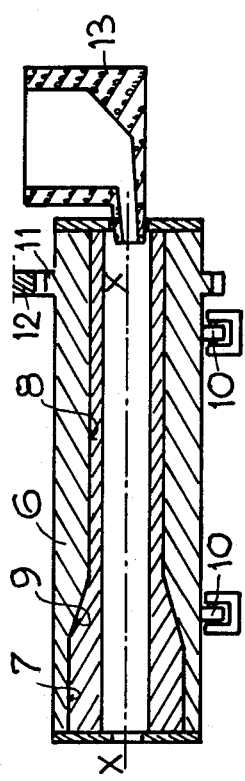
FIG. 2 is a diagrammatic cross-sectional view at a small scale of a centrifugal casting installation for the casting of tubular members according to the invention.

The steel is cast centrifugally, for example by means of an apparatus as illustrated in FIG. 2:

For casting a centrifugal casting mould 6 is used which has a horizontal or approximately horizontal axis X—X. The mould 6 has a cylindrical cavity which is staggered in two portions. One, 7, is of large diameter corresponding to the enlarged portion 2 of the one-piece tubular stiffening member to be obtained while the other portion 8 is of small diameter corresponding to the standard part 1 of the tubular member. Between the two, the moulding cavity includes a frustoconical portion 9 connecting the portions 7 and 8 which corresponds to the intermediate frustoconical connecting surface 3 of the stiffening member R.

The centrifugal casting mould 6 is placed on rolling wheels 10 for example and rotated for example by means of a toothed ring 11 meshing with a pinion 12 which is partly illustrated and which is moved by a speed-reducer unit, not shown.

The centrifugal casting mould 6 may be made of a special sand or of special steel. In the latter case, it is a permanent mould or chill mould which is suitably cooled. The mould is supplied with liquid steel for example by a retort 13 which may be used if the length of the mould of the tubular member R is not too great or otherwise by a spout which turns back on itself (not shown) for pouring the steel all at once into the moulding cavity 7, 8, 9. If the mould must be very long, the liquid steel may be supplied by a runner or two opposed runners wherein there is provided a relative translatory movement between the mould and each runner in order to pour the steel over the entire length of the mould. During high speed rotation of the mould 6, the alloyed steel which can be welded and which was previously mixed, is poured over the entire length of the mould and is subjected to a high acceleration or centrifugal force.

After cooling and stripping, a one-piece stiffening member R is obtained which, in order to be used as an anti-buckle and anti-crack stiffening member or buckle crack arrestor, should have a ductile/fragile transition temperature which is as low as possible and which in any case should be less than 20° C. A tubular stiffening member R of this type must be able to be welded on site without special preparations so that its weldability and hence equivalent carbon structure is of great importance.

The requirement that the elastic limit be as high as possible in view of the stresses which must be endured leaves only two possibilities for hardening the steel, which operation must be effected without any thermomechanical treatment:

rendering the grains of a ferritic structure finer, hardening by precipitation of a carbon phase which is sufficiently stable and homogeneously dispersed in the ferrite.

These two metallurgical processes are effectuated using a suitable thermal treatment including controlled cooling, hardening and annealing.

The stripped tubular stiffening member R is subjected to a homogenisation treatment at a temperature up to 1050° C. in a thermal treatment furnace from which air is excluded following which it is subjected to a thermal hardening treatment at a controlled speed from a temperature of between 800° and 950° C. and a thermal annealing treatment at a temperature of between 600° and 700° C.

Figure 5:
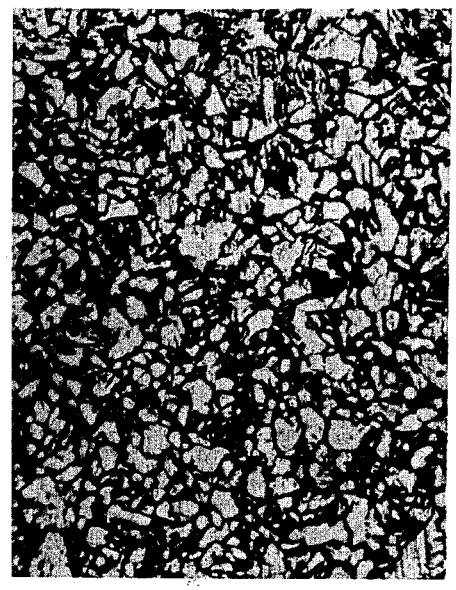
FIG. 5 is a micrograph at a magnification of 400× after initial attack of a ferritic structure of the tubular stiffening member of the invention.

If a sample of the stiffening member R is examined photomicrographically (FIG. 5), it will be seen that a very homogeneous structure is produced having a very fine ferrite grain whose size is greater than 10 on the American ASTM scale. The carbides are uniformly distributed in the ferrite.

The size of the carbides does not exceed 2 microns.

Moreover, the structure is therefore homogeneous as well as being isotropic.

In view of the aforesaid, the invention therefore includes a combination of the following elements:

the preparation of a special low carbon weldable steel which is lightly alloyed in order to limit its cost;

centrifugal casting;

the design of the shape of a one-piece tubular stiffening member so that it may be centrifugally casting and utilized as a stiffening member;

a final thermal treatment in order to obtain a suitable homogeneous structure.

Figure 3:
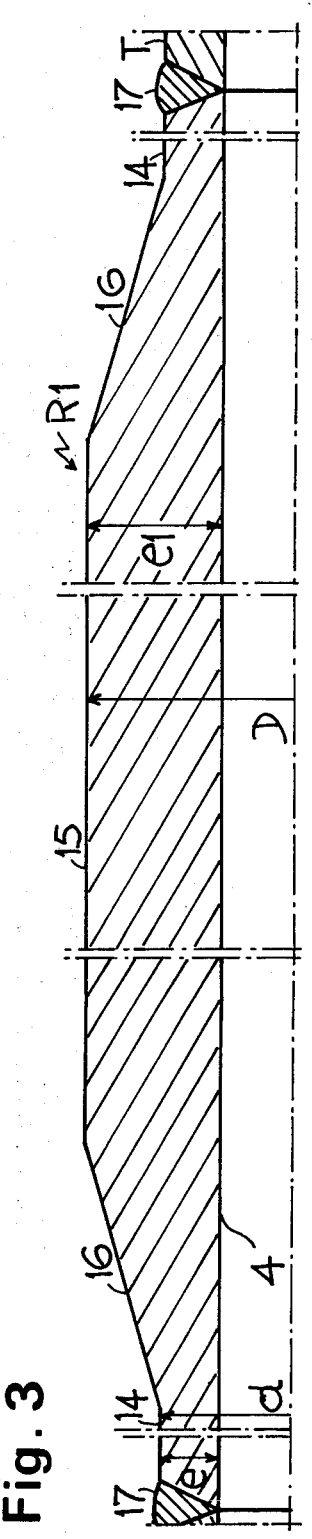
FIG. 3 is a view similar to FIG. 1 of a tubular coupling including a variation of the anti-buckle and anti-crack stiffening member of FIG. 1.

As shown in FIG. 3, an alternate embodiment of one-piece stiffening member or buckle crack arrestor R1 of the invention may be produced in the form of a very long sleeve comprising a tubular part 14 of minimum thickness e having an outer diameter d similar to the stiffening member R, but at each end and not at a single end. At the centre, an enlarged tubular part 15 having an excess thickness e1 is provided with frustoconical connecting surfaces 16 between the two parts. The lengths of the parts 14 and 15 are not shown to scale but are shown interrupted for inclusion in the diagram. Like the stiffening member R, the stiffening member R1 is produced by centrifugal casting with a casting installation similar to that of FIG. 2 but in which the mould has a cylindrical surface corresponding to the surface 15 of the coupling R1. The surfaces 14 and 16 of the coupling are obtained by machining.

The tubular coupling R1 is capable of being fitted by welding to a standard tubular member of the pipe-line T by means of weld beads 17.

Figure 4:
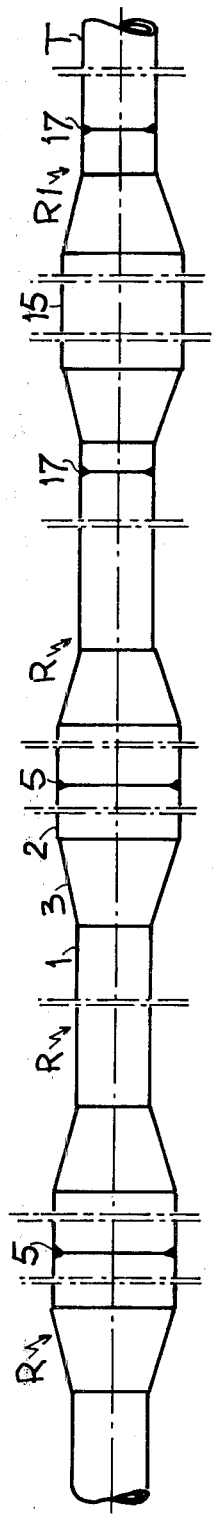
FIG. 4 is an elevational view at a small scale with interruptions of an underwater pipeline provided with anti-buckle and anti-crack stiffening members according to the invention.

In accordance with the example of FIG. 4, an underwater pipeline of the invention is constructed of tubular members T connected by weld beads 17 to tubular stiffening members such as R1 or, alternately, is constructed of tubular members such as the stiffening members R welded to each other by weld beads 5.

The outer surfaces of the stiffening members R–R1 may be rough cast, whereas the inner cylindrical surface 4 should be machined, at least briefly, in order to limit pressure losses when in use.

As a numerical example, a tubular stiffening member R1 of the invention (FIG. 3) has a length of 12 meters and is constructed of three parts:

a part having an outer diameter of 508 mm and a thickness of 25.4 mm, and a length of 1200 mm corresponding to the part 14 of the body of thickness e.

a part having an outer diameter of 558 mm, a thickness of 51 mm, and a length of 2000 mm corresponding to the enlarged part 15 of thickness e1.

a part having an outside diameter of 508 mm, a thickness of 25.4 mm, and a length of 8,800 mm corresponding to the part 14 of the body of thickness e.

What is claimed is:

1. In a tubular stiffening member for arresting the spread of buckling waves and cracks in pipes of an underwater pipeline to which it is fitted by welding having a substantially increased thickness with respect to that of the standard part of a pipe, the improvement comprising, the member being of one-piece construction, the member being constructed of a lightly alloyed low carbon weldable steel, said member being centrifugally cast and having a ferritic structure with stable carbides, said lightly alloyed low carbon weldable steel comprises as a percentage by weight, in addition to iron, at the most 0.08% carbon, at the most 0.30% silicon, manganese between 1.20 and 2.20%, at least one metal generating special carbide such as molybdenum between 0.20 and 0.50% and, after thermal treatment, a homogeneous ferritic structure with fine grains containing stable carbides homogeneously dispersed in the ferrite.

2. A tubular member according to claim 1, wherein its fine ferritic structure comprises grains of ferrite having a size greater than (10) on the ASTM scale and uniformly distributed carbides whose size does not exceed 2 microns.

3. A tubular member according to claim 1 having a ductile/fragile transition temperature less than at least 20° C.

* * * * *